United States Patent [19]

King

[11] 4,278,157
[45] Jul. 14, 1981

[54] FLUID CLUTCH

[76] Inventor: Palmer F. King, P.O. Box 867, Lewiston, Me. 04240

[21] Appl. No.: 12,889

[22] Filed: Feb. 16, 1979

[51] Int. Cl.³ .............................................. F16D 31/00
[52] U.S. Cl. ..................................... 192/58 R; 192/61
[58] Field of Search ..................... 192/58 R, 61, 70.29; 188/293, 294

[56] References Cited

U.S. PATENT DOCUMENTS

| | | | |
|---|---|---|---|
| 1,698,399 | 1/1929 | Funk | 192/58 R |
| 2,052,429 | 8/1936 | Tyler | 192/58 R |
| 2,193,806 | 3/1940 | De Vore | 192/61 |
| 2,660,279 | 11/1953 | Knight | 192/58 R |
| 3,292,755 | 12/1966 | Rogers | 192/58 R |

Primary Examiner—Henry Jaudon
Attorney, Agent, or Firm—Harris M. Isaacson

[57] ABSTRACT

A fluid clutch of the type having an eccentric pump mechanism comprises a valve sleeve which is slidably movable in an annular chamber in the impeller head and an axial fluid passage between the valve sleeve and the cylindrical shaft mounting member connected to the impeller head for providing fluid communication from the annular chamber to without the clutch housing to enable displacement of fluid during movement of the valve sleeve.

7 Claims, 6 Drawing Figures

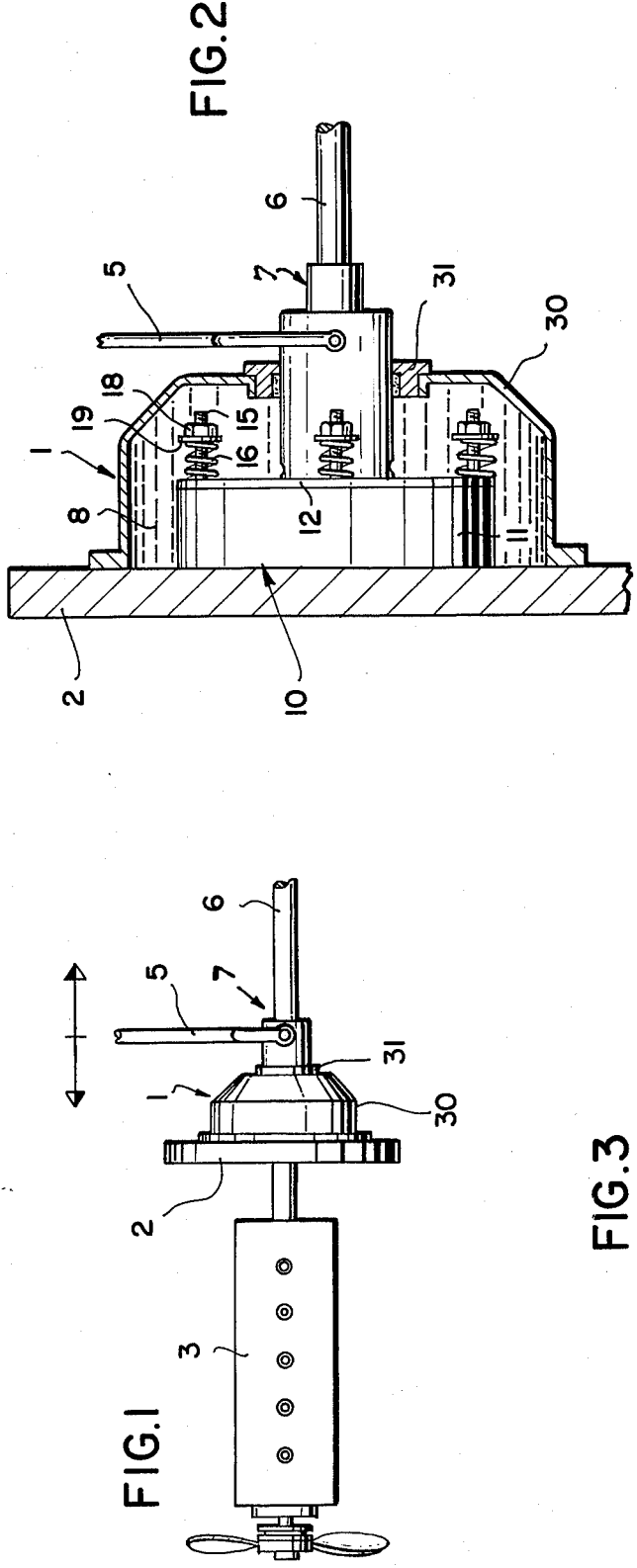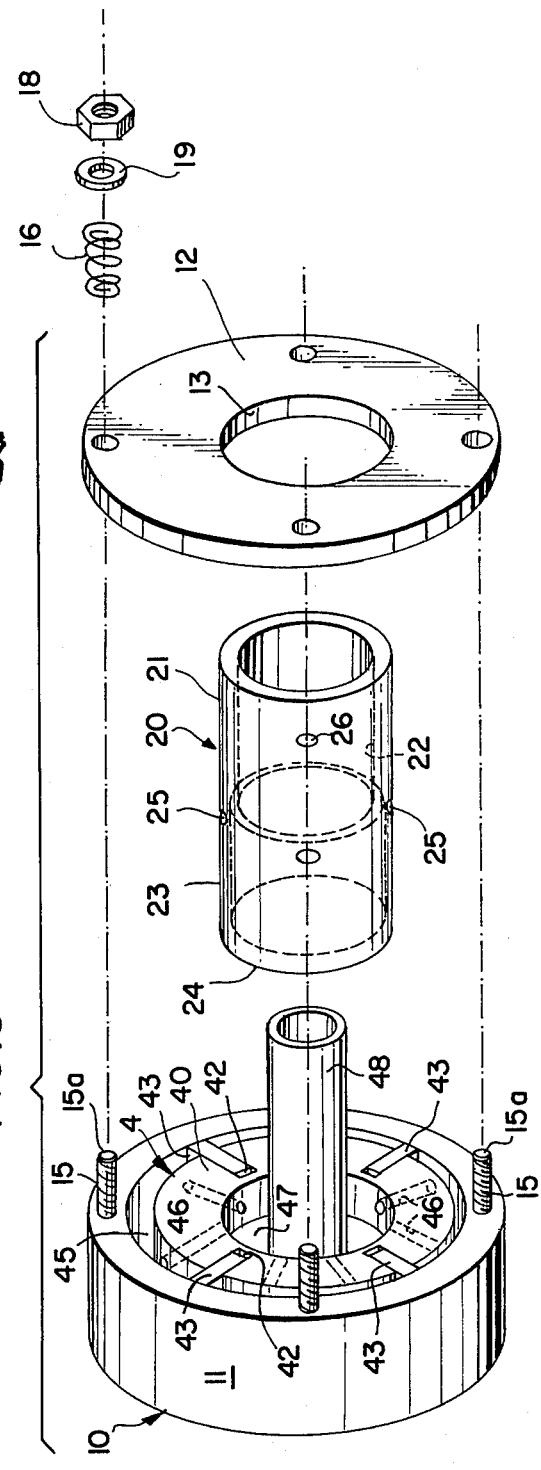

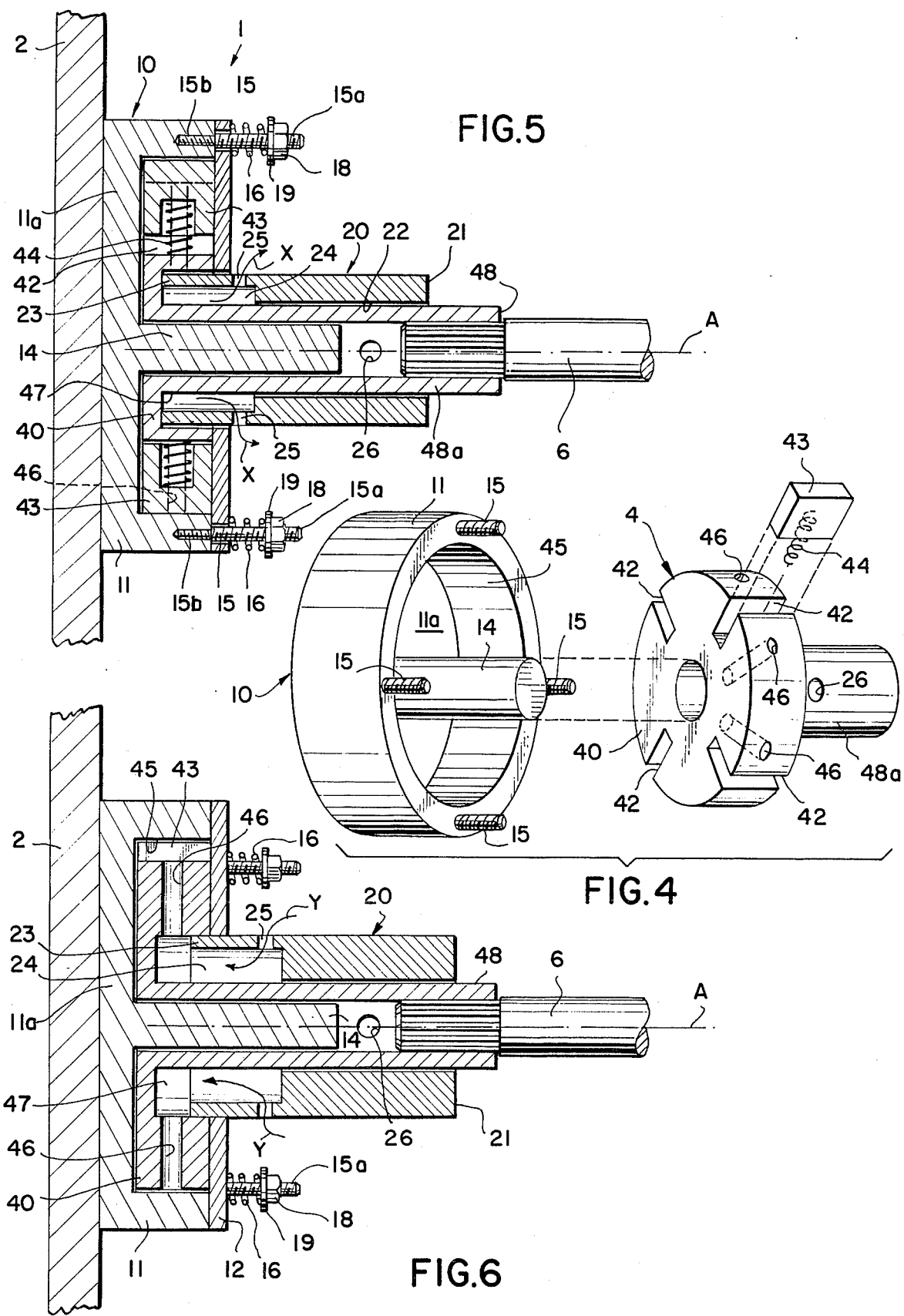

FLUID CLUTCH

The present invention relates to fluid clutches and in particular, those having an eccentric pump for circulating fluid throughout the clutch housing.

Fluid clutches are known in the prior art, but those clutches have the disadvantage of necessitating the use of numerous machine parts which make the structure complex and costly to manufacture and repair. Examples of the prior art clutches can be seen in U.S. Pat. Nos. 1,698,399, 2,052,429 and 2,660,279, wherein the basic principles of the operation of fluid clutches are disclosed and the complex structures are illustrated.

The object of the present invention is to provide a fluid clutch which utilizes relatively few parts so as to make it a simple structure and therefore easy to manufacture and repair.

Another object is to provide a fluid clutch which has an improved mechanism for effecting the engagement of the clutch components.

These and other objects of the invention are achieved by the fluid clutch of the present invention which comprises a cylindrical clutch housing connectable to an engine flywheel for rotation therewith about a given axis coincident with the axis of rotation of the flywheel and disposed eccentric to the central axis thereof and fluid impelling means comprising a substantially cylindrical impeller head, cylindrical means centrally disposed concentrically about the central axis of the impeller head for connecting the impeller to a transmission shaft, to be driven by the engine, for rotation therewith, means mounting the impeller head for rotation in the clutch housing about the central axis thereof and coincident with said given axis to define a periodically varying annular clearance between the inner cylindrical surface of the clutch housing and the outer surface of the impeller head during relative rotation of the two, pumping vanes extending radially outwardly from the impeller head and contacting the inner cylindrical surface of the clutch housing, an annular chamber disposed concentrically around the cylindrical means and opening at the shaft side of the housing and radially extending fluid passages in the impeller head providing fluid communication between the annular clearance and the annular chamber; clutch engaging means is provided comprising a cylindrical valve sleeve slidably mounted on the cylindrical means and having an outside diameter at the one end portion thereof nearer the clutch housing configured to be closely received within the annular chamber at the outer surface thereof, the one end portion being axially movable in the annular chamber between a first position wherein the radial fluid passages are blocked off and a second position wherein the radial fluid passages are unobstructed and means defining an axial fluid passage between the valve sleeve and the cylindrical means for providing fluid communication from the annular chamber to without the clutch housing to enable displacement of fluid during movement of the one end portion of the valve sleeve. Also provided is fluid reservoir means for retaining a supply of fluid for the clutch during the operation thereof.

In a preferred embodiment the means defining the axial fluid passage comprises the sleeve having an inner diameter along the other end portion thereof configured to be closely received around cylindrical means, an inner diameter at the one end thereof defining a free space between the valve sleeve and the cylindrical means and a plurality of through bores opening into the free space and positioned to be outside of the clutch housing when the one end portion of the valve sleeve is in the first and second positions.

The means mounting the impeller head for rotation comprises a cylindrical bearing shaft having the longitudinal axis thereof incident with the given axis, wherein the cylindrical means includes an axial bore therein disposed concentrically with the given axis and configured to receive the bearing shaft therein.

Also preferably, the cylindrical means comprises a hollow cylindrical connecting member finally connected to the impeller head and configured to receive the transmission shaft therein for rotation therewith and the pumping vanes include spring means for resiliently biasing the end portions of the vanes against the inner cylindrical surface of the clutch housing.

The clutch housing preferably comprises a cylindrical body, a base plate connected at one end for mounting on the flywheel, and a cover plate having a centrally disposed aperture configured to closely receive the outer diameter of the one end portion of the valve sleeve and means mounting the cover plate to the cylindrical body to enable the axial displacement thereof in response to a force greater than a preset valve in the axial direction towards the shaft.

The means mounting the cover plate comprises a plurality of axially disposed members in threaded engagement at one end with the cylindrical body and extending through the cover plate and threaded at the other end, a spring member disposed around each member and resting on the cover plate and a stop member threadably engaged with the other end of each threaded member for effecting the compression of the spring to correspond to the desired preset valve for the axial force.

As a result of this feature and the sliding sleeve valve, the clutch of the present invention will be virtually invulnerable to overloading or abuse and will not burn out. It can engage as smoothly as a disc-type clutch and when engaged, can be slipped only by the actuation of a clutch pedal or by the movement of the cover plate. Moreover, the cover plate will immediately return to its normal position after the overload is removed and the clutch will therefore resume normal operation without the need of repair.

Numerous other features, objects and advantages of the invention will become apparent from the following specification when read in connection with the accompanying drawings.

FIG. 1 is a schematic view of the fluid clutch of the present invention in situ.

FIG. 2 is a side view of a detail of FIG. 1.

FIG. 3 is an exploded view of the fluid clutch of the present invention.

FIG. 4 is an exploded view of further elements of FIG. 3.

FIGS. 5 and 6 are cross-sectional views of the structure of FIGS. 3 and 4 in two steps of operation.

Referring now to the figures in greater detail, where like reference numbers denote like parts in the various figures.

In FIGS. 1–4, the fluid clutch 1 of the present invention has the clutch housing 10 thereof connected in use to flywheel 2 which is driven by engine 3 of a vehicle, or the like. The fluid impelling means 4 is connected to transmission shaft 6 which is to be driven by the engine 3 when the clutch 1 is engaged. The clutch is engaged via a clutch lever 5 such as a clutch pedal or the like, which affects movement of the clutch engaging means 7 during use.

This being an eccentric pump type of fluid clutch, the clutch housing 10, which is cylindrical in shape, rotates with the flywheel 2 about the axis of rotation of the flywheel which is eccentric to the central axial axis thereof, and counterbalanced to enable even rotation. Moreover, the fluid impelling means 4 includes a substantially cylindrical impeller head 40 (FIG. 4) which is rotatable about its central axial axis which is coincident with the axis of rotation of the clutch housing 10. As a result, an annular clearance 45 is defined between the outer surface of impeller head 40 and the inner cylindrical surface of the clutch housing 10, as will be described in detail hereinafter.

Clutch fluid 8 is provided for the clutch 1 by reservoir means which includes a fluid casing 30 which is preferably flexible, but may be rigid and a stuffing box 31 providing a driving rotation of clutch members. The casing 30 is completely filled with oil 8 during use of the clutch and is constructed in a conventional manner. The clutch fluid 8 is preferably oil because it is non-compressible, but the fluid may be any other similar clutch fluid.

The clutch housing 10 includes a cylindrical main body 11, a base plate 11a which is shown integral with body 11, but may be sealingly mounted thereon and a cover plate 12 having a central aperture 13 and mounting apertures 19 therein. The cover plate 12 is mounted on the main body 11 in a manner described hereinafter.

The impelling means 4 includes the aforementioned impeller head 40 which has connected thereto cylindrical means for connecting the impeller head 40 to transmission shaft 6. The cylindrical means comprises a hollow cylindrical member 48 which is centrally disposed in the impeller head 40 and concentric therewith. The cylindrical member 48 receives shaft 6 at one end in a conventional manner to be rotatable therewith such as by mounting spline or other known mechanical connections. The other end of the cylindrical member 48 is fixed to impeller head 40 and in a preferred embodiment shown in FIG. 4 is integral therewith.

Around the cylindrical member 48 is disposed an annular chamber 47 which is also concentric with the impeller head 40. Running between the annular clearance 45 and the annular chamber 47 are a plurality of radial fluid passages 46 which open at both the outer surface of the impeller head 40 and the outer surface of the annular chamber 47.

Also provided are conventional pumping vanes 43 received in radial slots 42 in impeller head 40 and which are biased by springs 44 to be in contact with the inner cylindrical surface of the clutch housing 10.

The impeller head 40 is mounted for rotation in the clutch housing 10 by bearing shaft 14 which has its longitudinal axis coincident with the axis of rotation. The bearing shaft 14 is slidingly received in the hollow of cylindrical member 48. In a known manner the relative rotation of the impeller head 40 and the clutch housing 10 causes the annular clearance to be periodically varied due to the relative eccentricity of the two elements and this varying in conjunction with the sweeping of the pumping vanes 43 effects a toroidal circulation of clutch fluid in the clutch housing 10 through the radial passages 46.

The clutch engaging means 7 comprises a valve sleeve 20 which has a cylindrical end portion 23 and end portion 21 which is preferably cylindrical and has the same outside diameter as end portion 23. The inner diameter of end portion 21 is selected so that surface 22 is closely received about cylindrical member 48. The outer diameter of the end portion 23 is selected to be closely received within the annular chamber 47 at the outer surface thereof. The aperture 13 in cover plate 12 is also configured to closely receive end portion 23 of the sleeve 20.

The means defining an axial fluid passage between the sleeve 20 and cylindrical member 48 for fluid communication between the annular chamber 47 and without the clutch housing 10 comprises the inner diameter of end portion 23 of the sleeve 20 selected so that a free space exists between surface 24 and the outer surface of cylindrical member 48. Additionally, a plurality of through bores 25 are provided in the sleeve 20 which open at one end at surface 24 and at the other end at the outer surface of sleeve 20.

The sleeve 20 also includes holes 26 for connecting same to a clutch lever in a conventional mechanical manner so that the sleeve can be moved into the two operating positions.

In order to provide for clutch slippage when the clutch is engaged and an excessive load is applied thereto, means are provided for connecting the cover plate 12 to body 11 including axially extending rods 15 having one end 15a threadably engaged in the body 11 and another threaded end 15b. The cover plate 12 is placed over the rods 15 and thereafter, springs 16 are placed around rods 15 and rest on cover plate 12. Following this, washers 19 rest on the springs 16 and nuts 18 threadably engage end portion 15b. The tension on the cover plate 12 exerted by springs 16 can be adjusted by nuts 18 since the more compressed the springs 16, the greater the axial force necessary to lift the cover plate 12 from body 11. In use, because the oil is incompressible, if an unusual load is placed on the clutch, the oil in the annular chamber 45 and in chamber 47 will exert a force on the cover 12. The cover 12 will then lift up and effect disengagement due to the destruction of the fluid lock created by the clutch elements as will be hereinafter explained.

Referring now to FIGS. 5 and 6, the operation of the clutch will be explained with reference to the above-described structure.

In use, when the engine is running and the clutch is disengaged, as shown in FIG. 6, the flywheel 2 and hence the clutch housing 10 is rotating relative to the impeller head 40. The clutch is disengaged since the valve sleeve 20 is in the open position of FIG. 6, which enables the clutch fluid to flow in the toroidal path with no resistance between the annular clearance 45 and the annular chamber 47 via radial fluid passages 46. This provides no possibility of a fluid lock between the clutch housing 10 and the impeller head 40.

Upon actuation of a clutch lever 5 or clutch pedal movement of valve sleeve 20 is effected from the position shown in FIG. 6 to the position shown in FIG. 5 in order to engage the clutch. That which permits this change in position, wherein the sleeve 20 further enters chamber 47, despite the non-compressibility of the oil, in the axial passage described above. The displaced oil from the annular chamber 47 travels in accordance with arrows X in FIG. 5 to without the clutch housing 10 so that sleeve 20 can be easily and simply moved. When the end portion 23 of sleeve 20 blocks off radial passages 46, the toroidal circulation of the clutch fluid is prevented and the clutch fluid in the annular clearance 45 effects a fluid lock between impeller head 40 and clutch housing 10, thus imparting the rotative movement of clutch housing 10 around axis A to impeller head 40 which also rotates about axis A and thereby rotates shaft 6 via cylindrical member 48.

To disengage the clutch, the sleeve 20 moves from the position shown in FIG. 5 to that of FIG. 6. Here again the movement of the sleeve necessitates the displacement of the clutch fluid since it is non-compressible, and this is effected in accordance with arrows Y in FIG. 6 wherein clutch fluid from without the clutch housing 10 is drawn through the axial fluid passage into the annular chamber 47. At the same time, the radial passages 46 become unobstructed and the toroidal circulation of the clutch fluid is resumed, destroying the fluid lock whereby disengagement of the impeller head 40 and clutch housing 10 is obtained and the clutch is disengaged.

The terms and expressions which are employed are used as terms of description; it is recognized, though, that various modifications are possible.

It is also understood the following claims are intended to cover all of the generic and specific features of the invention herein described, and all statements of the scope of the invention which, as a matter of language, might fall therebetween.

Having described certain forms of the invention in some detail, what is claimed is:

1. A fluid clutch comprising a cylindrical clutch housing including a cover and connectable to an engine flywheel for rotation therewith about a given axis coincident with the axis of rotation of the flywheel and disposed eccentric to the central axis thereof, fluid impelling means comprising a substantially cylindrical impeller head, cylindrical means centrally disposed concentrically about the central axis of the impeller head for connecting the impeller to a transmission shaft, to be driven by the engine, for rotation therewith, means mounting the impeller head for rotation enclosed in the clutch housing about the central axis thereof and coincident with said given axis to define a periodically varying annular clearance between the inner cylindrical surface of the clutch housing and the outer surface of the impeller head during relative rotation of the two, pumping vanes extending radially outwardly from the impeller head and contacting the inner cylindrical surface of the clutch housing, an annular chamber disposed concentrically around the cylindrical means of said impeller head and opening at the shaft side of the housing and radially extending fluid passages in the impeller head providing fluid communication between the annular clearance and the annular chamber, clutch engaging means extendable into said enclosed clutch housing comprising a cylindrical valve sleeve slidably mounted on the cylindrical means and having an outside diameter at the one end portion thereof nearer the clutch housing configured to be closely received within the annular chamber at the outer surface thereof, the one end portion being movable in the annular chamber between a first position wherein the radial fluid passages are blocked off and a second position wherein the radial fluid passages are unobstructed whereby fluid may circulate within the clutch housing between said annular chamber and said annular clearance and means defining a fluid passage between the valve sleeve and the cylindrical means for providing fluid communication from the annular chamber to without the clutch housing to enable displacement of fluid during movement of the one end portion of the valve sleeve, and fluid reservoir means for retaining a supply of fluid for the clutch during the operation thereof.

2. The fluid clutch according to claim 1, wherein the means defining the fluid passage comprises the sleeve having an inner diameter along the other end portion thereof, configured to be closely received around cylindrical means, an inner diameter at the one end thereof defining a free space between the valve sleeve and the cylindrical means and a plurality of through bores opening into the free space and positioned to be outside of the clutch housing when the one end portion of the valve sleeve is in the first and second positions.

3. The fluid clutch according to claim 2, wherein the means mounting the impeller head for rotation comprises a cylindrical bearing shaft having the longitudinal axis thereof coincident with the given axis wherein the cylindrical means includes an axial bore therein disposed concentrically with the given axis configured to receive the bearing shaft therein.

4. The fluid clutch according to claim 2, wherein the cylindrical means comprises a hollow cylindrical connecting member fixedly connected to the impeller head and configured to receive the transmission shaft therein for rotation therewith.

5. The fluid clutch according to claim 2, wherein the pumping vanes include spring means for resiliently biasing the end portions of the vanes against the inner cylindrical surface of the clutch housing.

6. The fluid clutch according to claim 2, wherein the clutch housing comprises a cylindrical body, a base plate connected at one end for mounting on the flywheel, a cover plate having a centrally disposed aperture configured to closely receive the outer diameter of the one end portion of the valve sleeve the cover plate to the cylindrical body to enable the displacement thereof in response to a force greater than preset valve force.

7. The fluid clutch according to claim 6, wherein the means mounting the cover plate comprises a plurality of axially disposed around each member and resting on the cover plate and a stop member threadably engaged with the other end of each threaded member for effecting the compression of the spring to correspond to the desired preset valve force.

* * * * *